United States Patent Office 2,845,583
Patented July 29, 1958

2,845,583

CIRCUIT BREAKER CONTROL SYSTEM

John F. Reuther, Swissvale, and Sheldon D. Silliman, Forest Hills, Pa., assignors to Westinghouse Electric Corporation, East Pittsburgh, Pa., a corporation of Pennsylvania Application August 29, 1956, Serial No. 606,857

9 Claims. (Cl. 317—54)

Our invention relates generally to circuit breaker control systems, and has reference in particular to control apparatus for circuit breakers using semiconductor logic control elements.

Generally stated, it is an object of our invention to provide a static logic-element control circuit for circuit breakers that is simple and inexpensive to manufacture and is reliable and efficient in operation.

More specifically, it is an object of our invention to provide a static control system for circuit breakers utilizing transistor logic elements.

Another object of our invention is to provide in a logic control circuit for a circuit breaker, for utilizing a Flip-Flop memory circuit for energizing the closing coil of the circuit breaker in response to operation of a control device, and for utilizing another Flip-Flop memory circuit for controlling the first-mentioned Flip-Flop memory circuit thereby deenergizing the closing coil in response to closing of the breaker.

Yet another object of our invention is to eliminate some of the usual contact devices used in the control circuit of a circuit breaker by utilizing static circuit elements.

Still another object of our invention is to provide in a control system for a circuit breaker for eliminating all of the usual contact making devices by utilizing a contactless static sensing circuit.

Other objects will, in part, be obvious and will, in part, be explained hereinafter.

In practicing our invention in accordance with one of its embodiments, the closing coil of a circuit breaker is energized from an amplifier in response to the on output signal of a static transistor Flip-Flop memory circuit which is turned on by operation of a manual control switch. A second Flip-Flop memory circuit controlled by operation of the breaker turns the first Flip-Flop circuit off when the breaker closes. The second Flip-Flop circuit is turned off by an off output signal from the first Flip-Flop circuit, so that the system is in a normally deenergized condition.

As used herein, the term Flip-Flop or memory circuit refers to a circuit element which provides an on output signal in response to a first condition, which output signal continues even though said first condition ceases to exist, and terminates said output signal and provides an off output signal in response to second condition.

An Or circuit is a circuit element which provides an output signal in response to any one of a number of input signals.

An And circuit is a circuit element which provides an output signal, only if all of a plurality of input signals exist simultaneously.

A Not circuit is a circuit element which provides an output signal only so long as no input signal is applied.

For a more complete understanding of the nature and scope of our invention, reference may be made to the following detailed description which may be read in connection with the accompanying drawings, in which.

Figure 1:
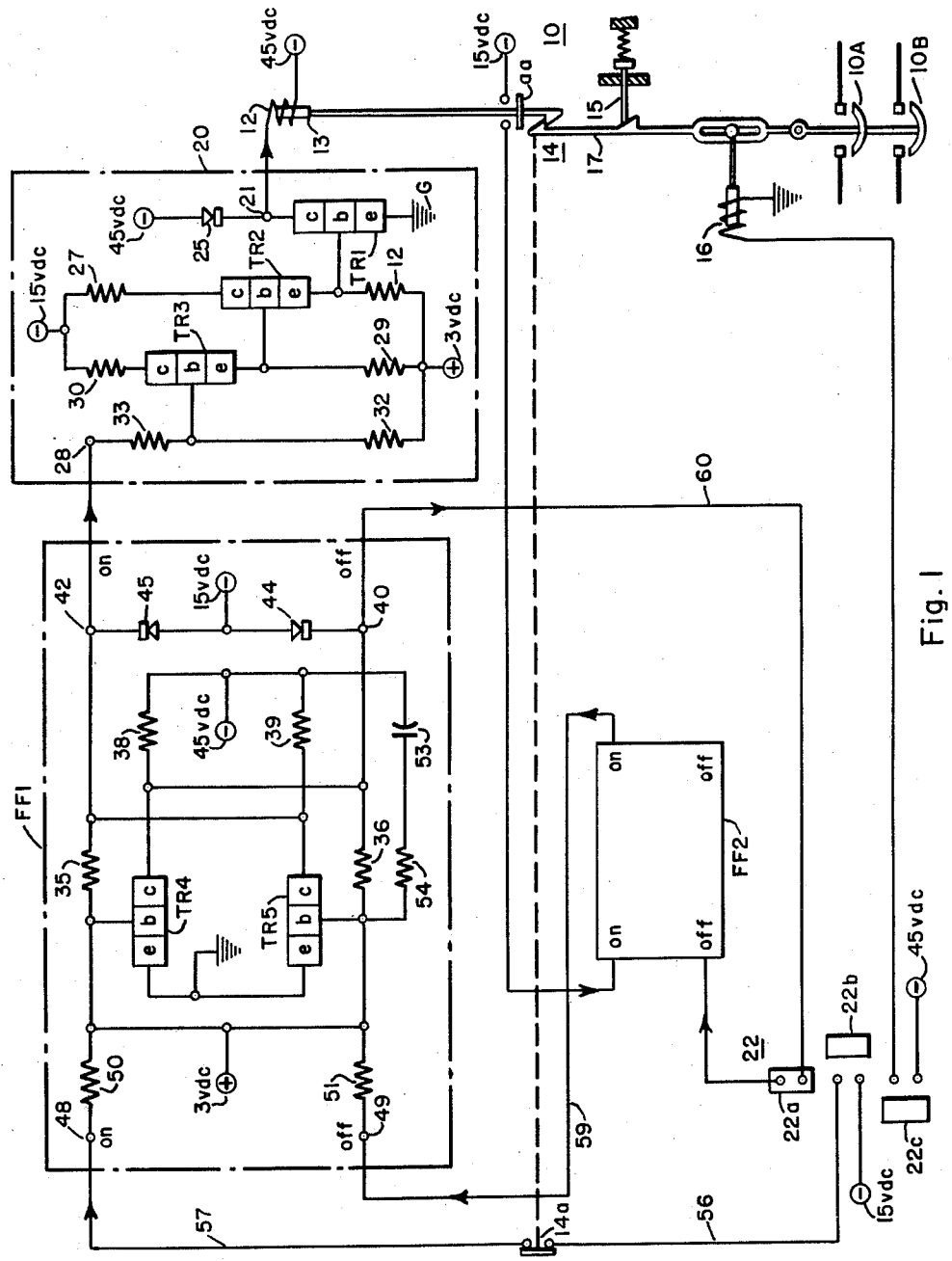
Figure 1 is a schematic diagram of a circuit breaker control system embodying the invention in one of its forms.

Referring to Fig. 1, the reference numeral 10 denotes generally a circuit breaker having a closing coil 12 for operating a mechanism including an armature 13 to close contacts 10A and 10B. The armature 13 is operatively connected to the contacts 10A and 10B by means of a releasable latch 14. A latch 15 holds the breaker contacts in the closed position, and means such as a trip coil 16 is provided for actuating a portion of the mechanism 17 to release both the latches 14 and 15 to permit trip-free operation of the breaker.

Energization of the closing coil 12 is effected by means of an amplifier 20 under the control of a Flip-Flop memory circuit FF1 under the control of a manual control switch 22. A second Flip-Flop memory circuit FF2, which is triggered by means of contact $aa$ on the mechanism of the circuit breaker 10, turns the Flip-Flop circuit FF1 off when the breaker closes. An off output signal from the Flip-Flop circuit FF1 then turns the Flip-Flop circuit FF2 off, so that the system is normally in a deenergized condition.

The amplifier 20 comprises a transistor TR1 which is arranged with an output terminal 21 to connect the closing coil 12 to ground at G, thereby connecting it in circuit with a 45 volt D.-C. source. Transistors TR2 and TR3 are connected in cascade with the transistor TR1 for controlling saturation thereof. The collector $c$ of transistor TR1 is connected to the 45 volt negative terminal of the source through a rectifier device 25 which protects the transistor against any reaction voltage surge from the closing coil. The emitter $e$ of the transistor TR2 is connected to the base $b$ of transistor TR1 and to the 3 volt positive terminal of the source for insuring positive cutoff. The collector $c$ of transistor TR2 is connected to the 15 volt negative terminal of the source through a resistor 27. The emitter $e$ of the transistor TR3 is connected to the base $b$ of transistor TR2 and to the 3 volt positive terminal of the source through a current limiting resistor 29. The collector $c$ of the transistor TR3 is connected to the 15 volt negative terminal of the source through a resistor 30 and has its base $b$ connected to the 3 volt positive terminal of the source through a resistor 32 and to the input terminal 28 of the amplifier through a resistor 33.

Typical values of components for the amplifier 20 are as follows:

Resistor 12 _____ ohms__ 1200
Resistor 29 _____ do____ 3900
Resistor 32 _____ do____ 6200
Resistor 33 _____ do____ 9100
Resistor 27 _____ do____ 270
Resistor 30 _____ do____ 1200
Transistor TR1 _____ Type H2
Transistors TR2, TR3 _____ Type WX305

With no signal applied to the base of transistor TR3, the transistor TR3 is blocked and the base $b$ of transistor TR2 is positive relative to its emitter $e$ so that it also is blocked. Likewise, the transistor TR1 is blocked and no output results. Should a negative signal be applied to the input terminal 28 of the amplifier, the base $b$ of transistor TR3 will be negative with respect to its emitter *e* and the transistor TR3 will saturate. This makes the base *b* of transistor TR2 negative and it also saturates. The base *b* of transistor TR1 is thereby made negative with respect to its emitter *e* and transistor TR1 saturates connecting the output terminal 21 and the closing coil 12 of the circuit breaker to ground G in circuit with the 45 volt negative terminal of the source to close the circuit breaker.

The Flip-Flop memory circuits FF1 and FF2 may each comprise a pair of transistors TR4 and TR5 having their emitters *e* connected to ground and having their base electrodes *b* and collectors *c* cross-connected through resistors 35 and 36, respectively. The collectors *c* are connected to the 45 volt negative terminal of the source through resistors 38 and 39, respectively. The collectors *c* are connected to an off output terminal 40 and an on output terminal 42, respectively, these terminals being connected to the negative terminal of a 15 volt source through rectifier devices 44 and 45, respectively, which operate as clamping diodes to hold these terminals to a −15 volts. The base electrodes *b* are connected to the on and off input terminals 48 and 49 through resistors 50 and 51, respectively.

The Flip-Flops are each provided with an initial condition circuit comprising a capacitor 53 and a resistor 54 connected between the 45 volt negative terminal of the source and the base *b* of transistor TR5 so as to effectively shunt the collector resistor 38 and permit the transistor TR5 to saturate as soon as power is applied. This effectively grounds the base *b* of transistor TR4 so that it is blocked, and the collector *c* of transistor TR5 is reduced to substantially ground potential so that no output voltage exists at the on output terminal 42. The off output terminal 40 being connected to the collector *c* of transistor TR4 which is blocked, will be at substantially −45 volts, so that an off output signal exists. This off output signal of Flip-Flop FF1 is applied to the off input terminal of the Flip-Flop FF2 and places it in the off condition also.

Typical values of the components of a Flip-Flop circuit are as follows:

Resistors 35, 36, 50, 51 _____ohms__ 9100
Resistors 38, 39 _____do____ 5100
Resistor 54 _____do____ 10,000
Capacitor 53 _____μfd__ .1
Transistors TR4, TR5 _____ Type WX305

When the control switch 22 is operated to close the breaker, a signal is applied to the on input terminal 48 of Flip-Flop FF1 from the −15 volt terminal through close contact 22*b*, conductor 56, contact member 14*a* of a latch check switch operated by the latch 14 to determine if the latch 14 is properly engaged, and conductor 57. This signal is applied to the base *b* of transistor TR4 and makes the base negative with respect to the emitter *e* so that transistor TR4 saturates and effectively grounds the base *b* of transistor TR5 causing it to block. The collector *c* of transistor TR4 is effectively connected to ground, so that the off output signal is removed from terminal 40. Since transistor TR5 is now blocking, the on output terminal 42 is substantially −15 volts. This signal applied to the transistor TR3 of the amplifier 20 causes transistor TR3 to saturate and applies a negative voltage to the base *b* of transistor TR2. Transistor TR2 saturates and applies a negative voltage to the base *b* of transistor TR1 causing it to saturate and connect the closing coil 12 to ground G, thereby operating the circuit breaker 10 to close the breaker.

When the auxiliary breaker contact *aa* closes, a −15 volt signal is applied to the on terminal of the Flip-Flop FF2. This results in an on output signal being applied to the off input terminal 49 of Flip-Flop FF1 through conductor 59. The off output signal causes the transistor TR5 to saturate, connecting the output terminal 42 substantially to ground and removing the on output signal from the amplifier 20. This renders the transistors TR3 and TR2 and TR1 non-conductive, so that the closing coil 12 is deenergized. As soon as transistor TR5 saturates and control switch 22 is released allowing close contact 22*b* to open, the transistor TR4 is rendered blocking so that the collector *c* which is connected to the off output terminal 40 returns to substantially −15 volts. This signal is applied through the conductor 60 to the off input terminal of the Flip-Flop FF2, through the off contact 22*a* of the control switch 22, turning the Flip-Flop FF2 to the off condition. Tripping of the circuit breaker may be effected by operating the control switch 22 to close the trip contact 22*c* to effect energization of the trip winding 16, which pivots the member 17 in a counterclockwise direction to release the latch 15 and open the contacts 10A and 10B.

Figure 2:
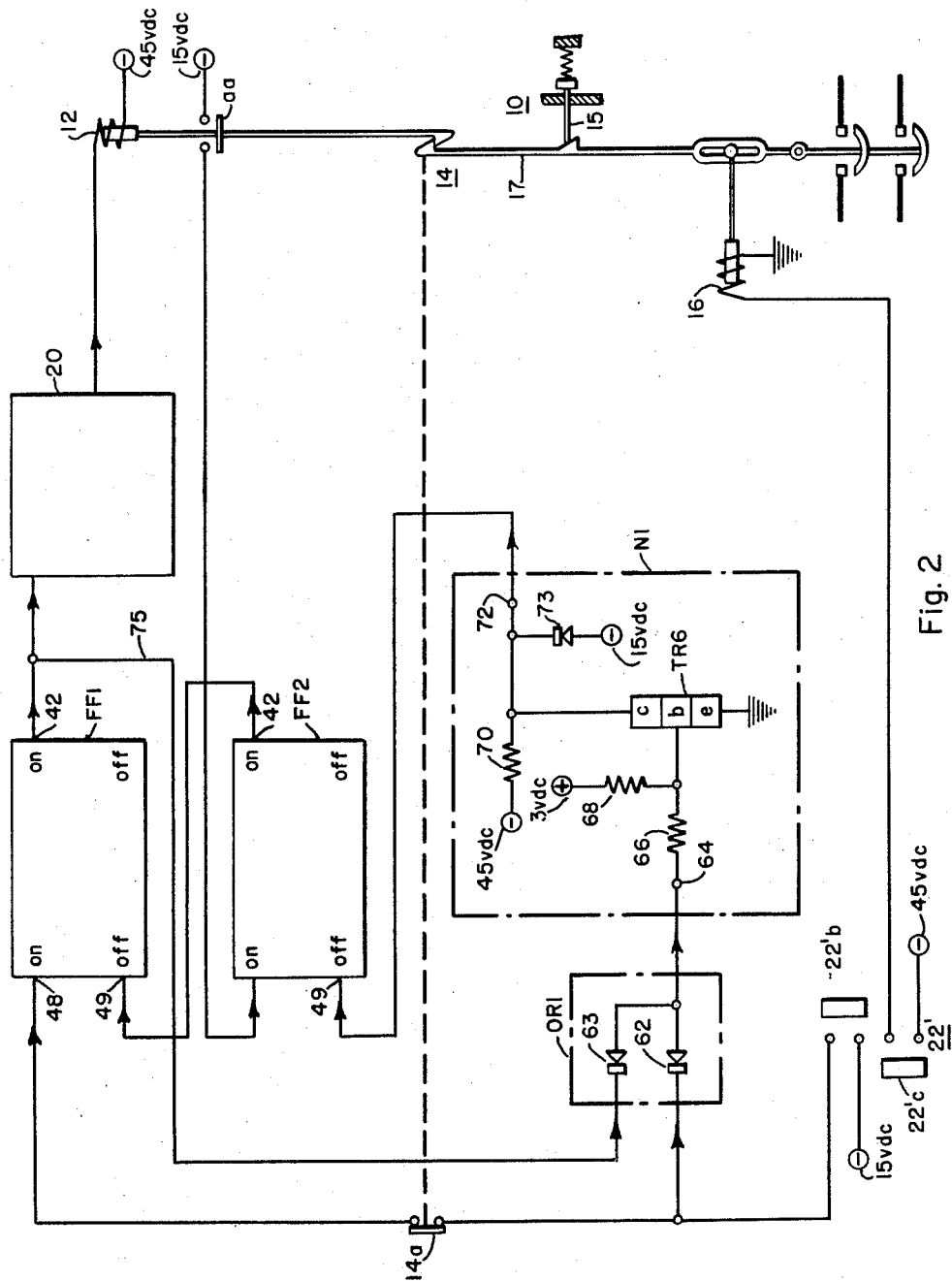
Fig. 2 is a schematic diagram of a circuit breaker control system embodying the invention in another of its forms.

Referring to Fig. 2, it will be seen that the circuit breaker 10 has its closing coil 12 energized from an amplifier 20 under the control of a Flip-Flop memory circuit FF1 and an additional Flip-Flop memory circuit FF2 arranged in a manner similar to that described in connection with Fig. 1 of the drawings. Instead of using an off contact member 22*a* as in the circuit of Fig. 1, an Or circuit OR1 and a Not circuit N1 are used in conjunction with the closing contact 22*b'* of a control switch 22'.

The Or circuit OR1 comprises a pair of rectifier devices 62 and 63 connected in parallel for applying a negative signal to the input terminal 64 of the Not circuit N1 from the on terminal 42 of Flip-Flop FF1 and from a close contact 22*b* of the switch 22'.

The Not circuit N1 comprises a transistor TR6 having its emitter *e* grounded while its base *b* is connected to the input terminal 64 through a resistor 66. The base *b* is also connected to the +3 volt terminal of a bias source through a resistor 68 to insure positive cutoff. The collector *c* is connected to the 45 volt negative terminal of a source through a resistor 70 and to the output terminal 72. A clamping diode 73 connects the output terminal 72 to the 15 volt negative terminal of a source to hold this terminal to a −15 volt signal.

Typical values of the components of the Not circuit are as follows:

Resistor 66 _____ohms__ 9100
Resistor 68 _____do____ 3900
Resistor 70 _____do____ 5600
Transistor TR6 _____ Type WX305

With no input signal applied to the terminal 64, the transistor TR6 is in a blocking condition and the output terminal 72 is maintained at substantially −15 volts. This terminal being connected to the off input terminal 49 of the Flip-Flop FF2, this Flip-Flop will be turned off. When a signal is applied to the input terminal 64 of the Not circuit N1 the transistor TR6 saturates and the collector *c* is at substantially ground potential. This removes the output signal from the terminal 72.

When a control switch 22' is operated to the closed position, a circuit is completed through close contact member 22*b'* both through OR1 for the Not circuit N1, and through the latch check switch 14*a* to the on terminal 48 of Flip-Flop circuit FF1. The transistor TR6 saturates and removes the output signal from the terminal 72. At the same time, the Flip-Flop FF1 is turned on and produces an on output signal at the on output terminal 42. This signal is applied to the amplifier 20 to effect energization of the closing coil 12 to close the breaker 10. At the same time, the output signal is applied through conductor 75 to the Or circuit OR1 and thence to the Not circuit, so that the Not circuit N1 is maintained in the off condition. Closing of the breaker 10 applies a signal through contact member *aa* to the on input terminal of Flip-Flop FF2 turning it on. This produces an on output signal at terminal 42 which signal is applied to the off input terminal 49 of Flip-Flop FF1 turning it off, and removing the input signal from the amplifier 20 to effect deenergization of the closing coil 12. Removal of the on output signal of FF1 and the signal from switch 22 removes the input to the Not circuit and results in an output signal which turns FF2 off. The circuit breaker 10 may be tripped by operating the manual control switch 22' to close the trip contact member 22c' and energize the trip coil 16.

Figure 3:
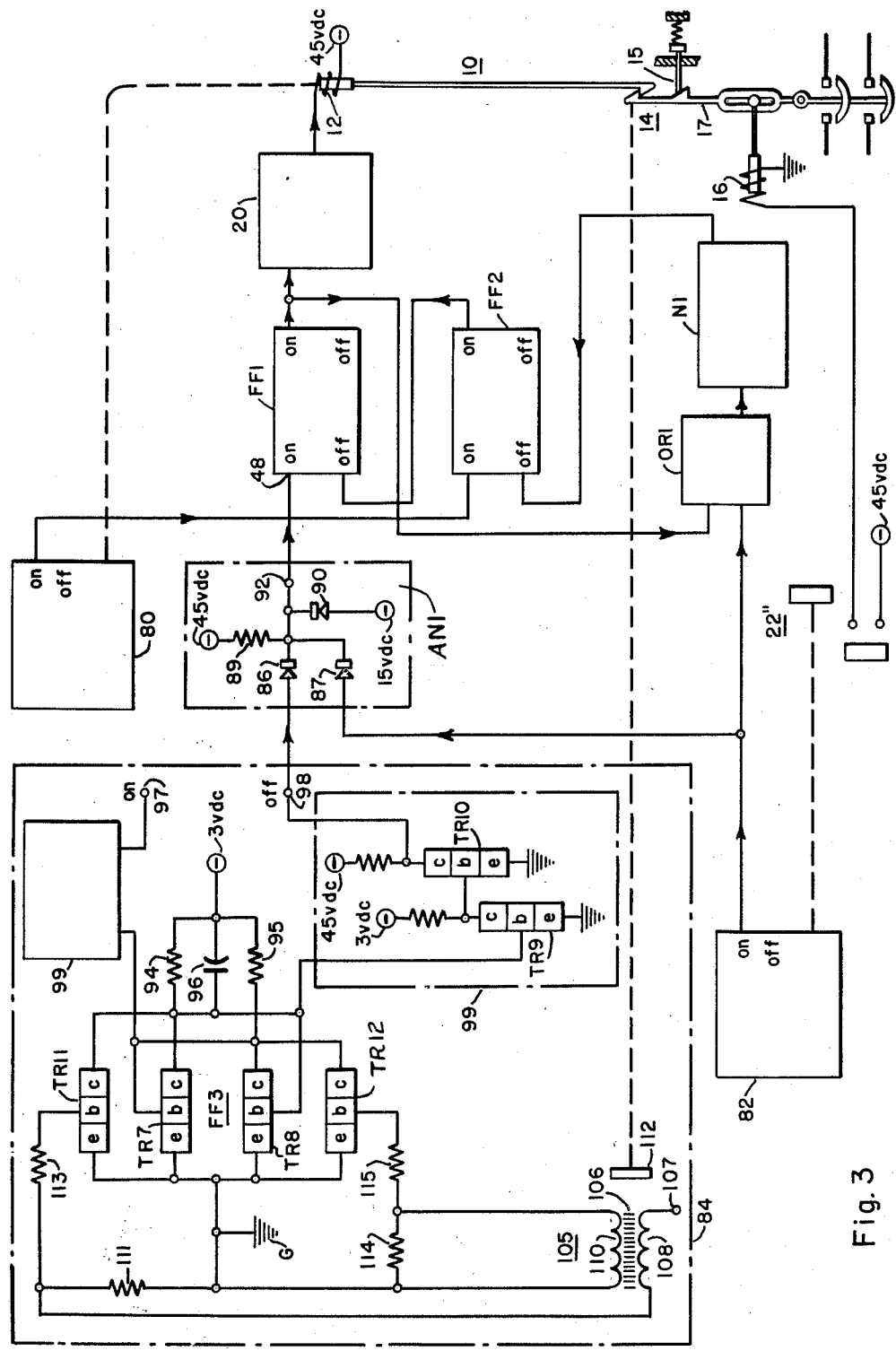
Fig. 3 is a schematic diagram of a circuit breaker control system embodying the invention in yet another of its forms.

Referring to Fig. 3, it will be seen that the circuit breaker 10 has its closing coil 12 energized from an amplifier 20 under the control of Flip-Flops FF1 and FF2 in conjunction with Or and Not circuits OR1 and N1 in a manner which is very similar to that described in connection with Fig. 2 of the drawings. Instead of utilizing an auxiliary contact *aa* on the circuit breaker, a contactless sensing circuit 80 is provided for applying a signal to the Flip-Flop circuit FF2 in response to closing of the breaker mechanism. Likewise, a similar contactless sensing circuit 82 is operated by means of a manual control device 22'' to effect closing of the circuit breaker 10 instead of utilizing a closing contact member 22b as in the circuit of Fig. 2. A similar contactless sensing circuit 84 is also provided in place of the latch check switch contact 14a of Fig. 2. The contactless sensing device 82 applies a signal to the Or circuit OR1 and to an And circuit AN1 which comprises a pair of rectifier devices 86 and 87 connected in parallel to the on input terminal 48 of Flip-Flop FF1 and to a −45 volt terminal of the source through a resistor 89. A clamping diode 90 is connected to the output terminal 92 of the And circuit for connecting it to the 15 volt negative terminal of the source for maintaining a definite terminal voltage. The contactless sensing device 84 is also connected to the Flip-Flop circuit FF1 through the And circuit AN1 so that signals from both of the devices 82 and 84 are required to effect operation of the Flip-Flop circuit FF1. A typical value for resistor 89 is 18K ohms.

Since the sensing devices 80, 82 and 84 are similar, only device 84 has been shown in detail, and it may comprise a pair of transistors TR7 and TR8 arranged in a Flip-Flop circuit FF3, and having their emitters *e* grounded at G, and their collectors *c* and bases *b* cross-connected. The collectors are connected to the negative terminal of a 3 volt source through resistors 94 and 95, respectively. A capacitor 96 connected in shunt with the resistor 94 renders the transistor TR8 initially saturated when voltage is applied, so that the collector *c* of transistor TR8 is at substantially ground potential and no output potential exists at the on output terminal 97. The transistor TR7 is blocked and its collector *c* will have an appreciable voltage on it. This voltage is applied to the off terminal 98 through an amplifier 99 which comprises transistors TR9 and TR10 which have their emitters *e* grounded and their collectors *c* connected to the negative terminals of a 13 voltage source and a 45 volt source through resistors 100 and 101, respectively. The collector *c* of TR9 is connected to the base *b* of TR10. With a signal applied to the base *b* of a transistor TR9, this transistor saturates and connects the base *b* of transistor TR9 to substantially ground. Transistor TR10 therefore blocks and the ouput terminal 98 is connected effectively to the −45 volt source to produce an off output signal.

The transistors TR7 and TR8 are controlled by transistors TR11 and TR12, respectively, and control of these transistors is effected from a magnetic amplifier 105 having a magnetic core member 106 with input and output windings 108 and 110, respectively. One terminal 107 of the input winding is connected to an 8.5 volt 10 kilocycle source which is grounded, and the other terminal is grounded through a resistor 111. A resistor 114 is connected across the output winding. Normally the principal portion of the input voltage is across the winding 108, and transistor TR12 will be saturated to insure the Flip-Flop FF3 being off.

A control member 112 comprising a permanent magnet is mechanically connected to the latch 14 and movable relative to core 106 for effecting saturation of the core member 106 when the latch 14 is released. This, in effect, reduces the impedance of winding 108 and produces an output voltage across resistor 111 which is applied to the base *b* of transistor TR11 causing it to saturate on negative half cycles and effect triggering of the Flip-Flop FF3 by blocking of transistor TR8. This causes saturation of transistor TR7 so that the base *b* of transistor TR9 is effectively grounded causing it to block. This means that the base *b* of transistor TR10 is connected to the negative terminal of the source causing the transistor TR10 to saturate. The output voltage is therefore removed from the output terminal 98 indicating that the latch 14 is not engaged. Operation of the Flip-Flop circuit FF1 to close the circuit breaker is thereby prevented. In other respects of operation, the system of Fig. 3 functions in substantially the same manner as that described in connection with the system of Fig. 2.

Typical values for the components of the sensing circuit 84 are as follows:

| | |
|---|---|
| Resistors 94, 95, 110, 111, 100 | 1000 ohms. |
| Resistors 101, 115 | 100,000 ohms. |
| Resistor 113 | 70,000 ohms. |
| Transistors TR7, TR8, TR11, TR12 | SB–100 or CK–722. |
| Transistor TR9 | SB–100 or CK–722. |
| Transistor TR10 | 2N54. |
| Magnetic amplifier 105, winding 108—300 turns, winding 110—150 turns; both windings wound on a ceramic bobbin, carrying a magnetic core wound of 15 turns of .0005 inch magnetic ribbon ⅛ inch wide having a physical dimension of ⅜ inch O. D. and ¼ inch I. D., with the magnetic ribbon comprising 50% nickel and 50% iron alloy. | |

From the above description and the accompanying drawings, it will be apparent that we have provided a simple and effective manner for controlling the operation of a circuit breaker using transistor static logic elements. A control system embodying the features of our invention is compact in design and is reliable in operation. Since the number of moving contacts is either greatly reduced or completely eliminated, trouble from faulty contacts is thus obviated and the reliability of a system thereby improved.

Since certain changes may be made in the above-described construction without departing from the spirit and scope thereof, it is intended that all the matter contained in the above description and shown in the accompanying drawings shall be considered as illustrative and not in a limiting sense.

We claim as our invention:

1. Control apparatus comprising, a Flip-Flop circuit having an output circuit connected to effect energization of an operating winding of a device and having a plurality of input circuits, control means connected to apply a signal to one of the input circuits, and means including an additional Flip-Flop circuit controlled by the device connected to apply a signal to another of the input circuits of the first-mentioned Flip-Flop circuit.

2. In a control circuit for a circuit breaker having a closing coil, a Flip-Flop circuit having an output circuit connected to effect energization of said coil and having a plurality of input circuits, a manual control device connected to apply a signal to one of said input circuits, an additional Flip-Flop circuit having an output circuit connected to apply a signal to the other input circuit of the first-mentioned Flip-Flop circuit and having a plurality of input circuits, control means actuated by the breaker to apply a signal to one of the input circuits of the additional Flip-Flop circuit, and means connecting the Flip-Flop circuits to apply a signal to another of the input circuits of the additional Flip-Flop from the first-mentioned Flip-Flop circuit.

3. Control apparatus for a device having an operating winding comprising, a Flip-Flop circuit having a plurality of input circuits and output circuits, circuit means connecting the operating winding to one of the output circuits, control means operable to apply a signal to one of the input circuits to effect energization of the operating winding, an additional Flip-Flop circuit having an output circuit connected to another one of said input circuits and having a plurality of input circuits, switch means operated by the device connected to apply a signal to one of the input circuits of the additional Flip-Flop circuit, and circuit means connecting another of the input circuits of the additional Flip-Flop circuit to another of the output circuits of the first-mentioned Flip-Flop circuit.

4. In a control circuit for a circuit breaker having a closing coil, a Flip-Flop circuit having an output circuit connected to effect energization of the closing coil and having on and off input circuits, circuit controlling means connected to apply a signal to the on input circuit, an additional Flip-Flop circuit having off and on input circuits and an output circuit connected to the off input circuit of the first-mentioned Flip-Flop circuit, control means operated by the breaker to apply a signal to the on input circuit of the additional Flip-Flop circuit, a Not circuit having an output circuit connected to apply a signal to the off input circuit of the additional Flip-Flop circuit and having an input circuit, an Or circuit having an output circuit connected to the Not input circuit and having a plurality of input circuits, circuit means connecting the circuit controlling means to one input circuit of the Or circuit, and additional circuit means connecting the output circuit of the first-mentioned Flip-Flop circuit to another input circuit of the Or circuit.

5. Control apparatus comprising, a circuit breaker having a closing coil, a Flip-Flop circuit connected to effect energization of the closing coil, circuit controlling means connected to apply a signal to the Flip-Flop circuit to operate it to one stable condition, an additional Flip-Flop circuit operable in one condition to apply a signal to the first-mentioned Flip-Flop circuit to operate it to another condition, means including a Not circuit and an Or circuit jointly controlled by the circuit controlling means and the first-mentioned Flip-Flop circuit connected to apply a signal to the additional Flip-Flop circuit to operate it to another condition, and means operated by the breaker connected to apply a signal to the additional Flip-Flop circuit to operate it to said one condition when the breaker closes.

6. Control apparatus for a circuit breaker having a closing coil comprising, a Flip-Flop circuit connected to effect energization of the closing coil, an And circuit connected to effect operation of the Flip-Flop to energize the closing coil, circuit controlling means connected to apply a signal to the And circuit, an additional Flip-Flop circuit connected to apply a signal to the first-mentioned Flip-Flop circuit to effect deenergization of the closing coil, circuit controlling means operated by the breaker to apply a signal to the additional Flip-Flop circuit to cause it to apply a signal to the first-mentioned Flip-Flop circuit, means including a Not circuit and an Or circuit connected to apply a signal to the additional Flip-Flop circuit to terminate the signal applied by it to the first-mentioned Flip-Flop circuit, manual circuit controlling means connected to apply signals to the And and Or circuits, and circuit means applying a signal from the first-mentioned Flip-Flop circuit to the Or circuit.

7. In a control circuit for a circuit breaker having a closing coil; an amplifier connected to effect energization of the closing coil; a Flip-Flop circuit comprising a pair of transistors having cross-connected collectors and base electrodes, and grounded emitters, impedance means connecting the collectors to a negative source of direct current, a capacitor connected in shunt with the impedance means of one of the transistors, means connecting the collector of the other transistor to provide an on output terminal for applying a signal to the amplifier; means including a manual control switch connected to an on input terminal to apply a signal to the base electrode of said one transistor; an additional Flip-Flop having an on output terminal connected to an off input terminal to apply a signal to the base electrode of the other transistor; circuit means including said manual control switch connecting an off output terminal at the collector of said one transistor to an off input terminal of the additional Flip-Flop circuit; and circuit controlling means operated by the breaker connected to apply a signal to an on input terminal of the additional Flip-Flop when the breaker closes.

8. Control apparatus for a circuit breaker having a closing coil comprising; an amplifier connected to energize the closing coil; a Flip-Flop memory circuit having a pair of transistors with cross-connected collectors and base electrodes and direct connected emitters, impedance means connecting the collectors to a source of negative voltage, a capacitor connected in shunt with the impedance means of one transistor, an off output terminal at the collector and an on input terminal at the base electrode of said one transistor, an on output terminal at the collector and an off input terminal at the base of the other transistor; circuit means connecting the amplifier to the on output terminal; means including a manual control switch connected to apply a signal to the on input terminal; an additional Flip-Flop memory circuit having an on output terminal connected to the off input terminal of the first-mentioned Flip-Flop memory circuit, an on input terminal and an off input terminal; switch means operated by the breaker to apply a signal to the on input terminal of the additional Flip-Flop memory circuit; a Not circuit having an output terminal connected to the off input terminal of the additional Flip-Flop memory circuit and having an input terminal; an Or circuit having an output terminal connected to the Not input terminal and having a plurality of input terminals; circuit means connecting the on output terminal of the first-mentioned Flip-Flop memory circuit to one of the Or input terminals; and additional circuit means connecting the manual control switch to another of said plurality of input terminals.

9. In combination, a circuit breaker having separable contacts, a latching-type trip-free mechanism therefor and a closing coil for operating the mechanism; an amplifier connected to effect energization of the closing coil; a static logic circuit having a pair of transistors with cross-connected collectors and base electrodes and having grounded emitters, impedance means connecting the collectors to the negative terminal of a direct current source, a capacitor connected in shunt with the impedance means of one of the transistors, said transistors having an off output terminal at the collector and an on input terminal at the base of said one transistor and an on output terminal at the collector and an off input terminal at the base of the other transistor; circuit means connecting the output terminal to the amplifier; an And circuit having an output terminal connected to the on input terminal and having a pair of input terminals; means including a saturable reactor and a magnetic control member actuated by the latching means of the mechanism connected to apply a signal to one of the And input terminals when the mechanism is latched; a manual control device having a saturable reactor and a movable magnetic control member operable to apply a signal to the other input terminal of the And circuit; an additional static logic circuit element having an on output terminal connected to the off input terminal of the first-mentioned logic circuit and having on and off input circuits; a contactless control device including a saturable magnetic amplifier and a magnetic control member operated by the breaker mechanism to apply a signal to the on input circuit of the additional logic circuit when the breaker closes; a Not circuit having an output circuit connected to the off input terminal of the additional logic circuit; and an Or circuit controlled by the manual control device and the first-mentioned logic circuit for applying a signal to the Not circuit.

References Cited in the file of this patent

UNITED STATES PATENTS 2,714,658     Greenfield _____ Aug. 2, 1955